July 19, 1966     J. SMITH     3,261,165
JET THRUST REVERSER
Filed July 1, 1964
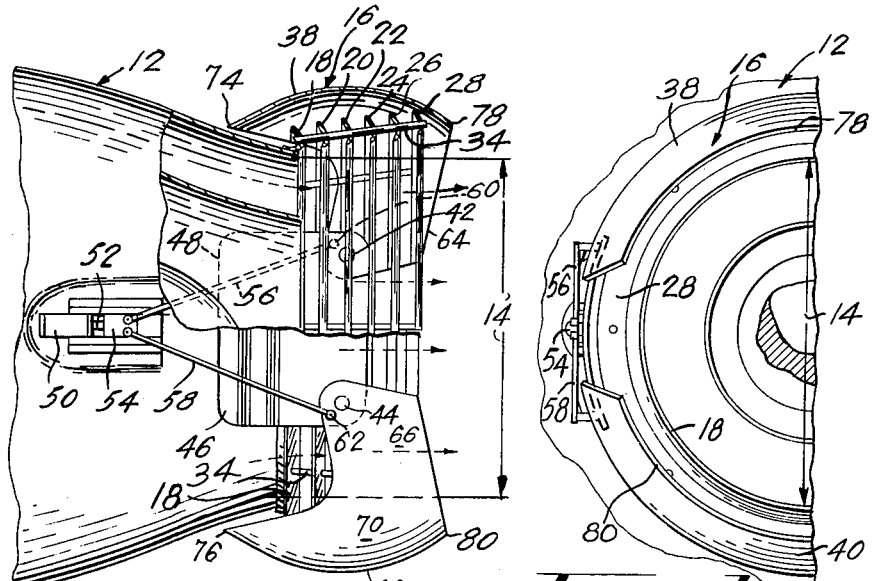
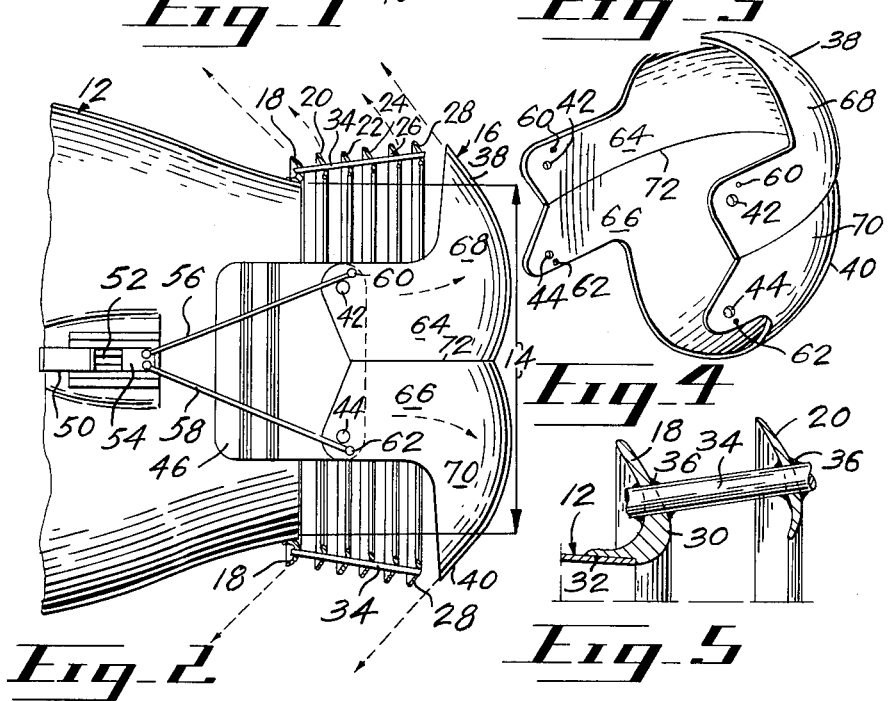
INVENTOR
James SMITH
ATTORNEY

United States Patent Office 3,261,165
Patented July 19, 1966

3,261,165
JET THRUST REVERSER
James Smith, Boucherville, Quebec, Canada, assignor to United Aircraft of Canada Limited, Longueuil, Quebec, Canada
Filed July 1, 1964, Ser. No. 379,472
6 Claims. (Cl. 60—35.54)

The increasing use of jet engine powered aircraft has emphasized the problems of braking the aircraft. As the aircraft wing loading is increased, the size of air strips will have to be increased to accommodate the landing aircraft. Wheel and air brakes have generally not proved satisfactory.

A primary object of the present invention is to provide a novel gas deflector means downstream of a fixed nozzle whereby the exhaust gas energy can be utilized to aid in braking the aircraft or similar jet powered vehicle.

Another object of the invention is to provide fixed louvers out of the normal path of travel of the engine exhaust gases and a pair of movable visor members which combine to substantially reverse the thrust direction of the engine exhaust gases.

A still further object of the invention in conformance with that set forth is to provide a pair of displaceably mounted jet engine exhaust shrouds or visors which in one position mask exhaust gas deflecting louvers and in a second position function to reverse the thrust of the engine exhaust gases and in cooperation with the louvers function to aid in braking the jet powered vehicle.

A still further object of the present invention is to provide a pair of cooperating jet engine exhaust shrouds which are effectively blended or streamlined with the jet engine pipe skin and include portions which are reacted upon by the normal air stream over the outer surface of the jet engine to prevent interference with the exhaust gases.

And yet another object of the invention is to provide a novel jet engine shroud or visor in conjunction with louvers downstream of the terminal end of the jet engine nozzle whereby no sealing problems are involved and vehicle braking is readily afforded through reversal of the reactive force of the jet engine exhaust.

These together with other and more specific objects will become apparent from a consideration of the following description of an exemplary embodiment when considered in conjunction with the accompanying drawing forming a part thereof, wherein:

FIGURE 1 is a fragmentary side elevation of the exhaust section of a jet engine with the novel thrust-reversing attachment thereon, portions being broken away, and showing the normal position of parts;

FIGURE 2 is a view similar to FIGURE 1 showing the part for reversing the engine thrust, the deflecting louvers being shown in section;

FIGURE 3 is a fragmentary rear elevation looking from right to left at FIGURE 1;

FIGURE 4 is a perspective view of the exhaust shroud of the invention; and

FIGURE 5 is an enlarged fragmentary view of a pair of the deflecting louvers of FIGURE 1.

Referring to the drawings in detail, a jet engine tail pipe or housing is indicated generally at 12 and comprises a final jet nozzle or exhaust opening 14 which is preferably circular, as seen in FIGURE 3. The particular type of jet engine is not critical since the jet thrust reverser 16 of the invention can be utilized with various type engines.

The jet thrust reverser 16 comprises a plurality of generally circular louver elements 18–28 which are preferably circular or correspond in shape to the final jet nozzle 14. The louver elements 18–28 have a concave-convex cross-section; see 20 in FIGURE 5; and element 18 has a relatively thickened base annulus 30 which is undercut at 32 to be fixedly seated and secured on the exhaust pipe 12. The louver elements 20–28 have the concave surfaces directed forwardly, and the louvers are rigidly secured in longitudinally spaced relation rearwardly of the final jet nozzle 14 by means of rearwardly diverging rods 34 by means of welding, as seen at 36.

The louvers 20–28 are of relatively increasing diameters and the louvers in no manner interfere with the normal forces of the exhaust jet of the engine. Since the louvers in no manner interfere with normal jet engine operation, no sealing problem is encountered.

The thrust reverser 16 comprises a pair of reversing-deflector elements or shrouds 38 and 40 which are pivotally mounted at 42 and 44, respectively, on mounting plates 46 and 48 suitably secured at opposite sides of the nozzle or housing 12.

The jet housing 12 has mounted on opposite sides a pair of suitable power means such as a fluid-operated motor 50 including a piston rod 52 having mounting block 54 connected to force transmitting links 56 and 58 pivotally connected at 60 and 62, respectively, to the shrouds 38 and 40. The pivotal connections 60 and 62 are offset from the shroud pivots 42 and 44 a sufficient distance to provide the necessary lever arm to rotate the shroud about the pivots 42 and 44 from forward thrust position (shown in FIGURE 1) to reverse thrust position (shown in FIGURE 2).

The shrouds 38 and 40 comprise mounting-arm portions 64 and 66 which are integral with concave-convex shell portions 68 and 70, respectively. The shrouds 38 and 40, when closed for thrust reversal (see FIGURE 2) will mate at confronting edges 72, as seen in FIGURES 2 and 4.

The shell portions 68 and 70 will normally overlie the outer surface of the louvers 18–28 (see FIGURE 1), i.e., during normal engine operation. Since the louvers are of increasing diameter, there will be no interference with the normal engine operation. The outer surface of the shells 68 and 70 will generally blend at forward edges 74 and 76 and substantially normal air movement along the outer surface of the engine will occur. The rear trailing edges 78 and 80 of the shells 38 and 40 are disposed outwardly of the jet nozzle 14.

When the shrouds 38 and 40 are in the closed position, exhaust from the engine will be directed by the shrouds and louvers forwardly, i.e., more than 90 degrees whereby a force in generally direct opposition to normal vehicle movement is supplied. The shrouds may be so conformed and the pivots so placed that the reactive forces in the shrouds would normally maintain the shrouds out of the exhaust stream.

Briefly in review, the present invention generally involves means for reversing the thrust of gases from a conventional propelling nozzle. Nozzle efficiency is not impaired since the thrust reverser is *downstream* of the propelling nozzle. The circular louvers minimize or uniformly distribute strains occurring when the exhaust gases are redirected or reversed from the normal rearward direction.

The jet shrouds are normally out of the exhaust gas stream most of the time and are substantially spherical in shape; thus they can be relatively light in "weight" and do not materially reduce the "pay" load.

There is relatively little initial pressure on the shrouds and thus relatively little force will be required to move the shrouds to a closed position.

The louvers are in a fixed cascade, i.e., progressively reduced diameter, and supplement the reversing of the exhaust jet afforded by the shrouds and are clear of the normal exhaust jet.

Although a particular embodiment of the invention has been described it, will be understood by those skilled in the art that many modifications may be made without departing from the basic spirit of the present invention, and therefore, within the scope of the appended claims, the invention may be practised other than has been specifically described.

I claim:
1. In a jet propulsion power plant having a jet pipe and nozzle for the rearward discharge of a propulsive jet stream; louver means fixedly secured on said jet pipe rearwardly and outwardly of said nozzle; shroud means on said jet pipe, said shroud means comprising a pair of shell elements pivotally mounted on mutually parallel axes of rotation outwardly of said nozzle, said shell elements including a forward edge normally blending with the outer surface of said jet pipe and enclosing a portion of said fixed louvers therein, said shells including a trailing edge disposed outwardly of said jet nozzle during normal engine operation, and power means operatively connected to said shells for pivoting them into confronting relation with respect to said nozzle and positioning said trailing shell edges in juxtaposed relation.

2. The structure as claimed in claim 1, in which said louver means comprises at least one continuous plate element circumposed about said nozzle in edgewise relation with respect to the direction toward which exhaust gases will be propelled from said nozzle.

3. The structure as claimed in claim 1, in which said louver means comprise a plurality of longitudinally spaced continuous plate elements circumposed about said nozzle, said continuous plates progressively increasing in diameter from the rear edge of said jet pipe.

4. The structure as claimed in claim 3, in which said jet nozzle has a circular cross-section, and said plates are correspondingly circular in elevation.

5. The structure as claimed in claim 2, in which said plates have a transverse concave-convex cross-section, the concave portion opening forwardly from the rear edge of said jet pipe.

6. The structure of claim 1, in which said shells are substantially semi-spherical and include planar trailing edges engageable with each other when said shells are disposed transversely of said jet nozzle, the leading edges of said shells being generally arcuate and conforming generally to the outer surface of said pipe.

References Cited by the Examiner
UNITED STATES PATENTS

| | | | |
|---|---|---|---|
| 2,735,264 | 2/1956 | Jewett | 60—35.55 |
| 2,960,822 | 11/1960 | Bertin | 60—35.54 |
| 3,002,342 | 10/1961 | Schatzki | 60—35.54 |
| 3,024,602 | 3/1962 | Bertin et al. | 60—35.54 |

FOREIGN PATENTS

| | | |
|---|---|---|
| 1,150,556 | 1/1958 | France. |
| 800,770 | 9/1958 | Great Britain. |

MARK NEWMAN, *Primary Examiner.*
A. L. SMITH, *Assistant Examiner.*